United States Patent
Tochikawa et al.

(10) Patent No.: US 7,794,528 B2
(45) Date of Patent: Sep. 14, 2010

(54) EXHAUST GAS CLEANING DEVICE FOR INTERNAL COMBUSTION ENGINE

(75) Inventors: Kazuharu Tochikawa, Kariya (JP); Satoru Nosaka, Nagoya (JP); Makoto Saito, Okazaki (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 443 days.

(21) Appl. No.: 11/604,301

(22) Filed: Nov. 27, 2006

(65) Prior Publication Data
US 2007/0119128 A1 May 31, 2007

(30) Foreign Application Priority Data
Nov. 25, 2005 (JP) .............................. 2005-339940

(51) Int. Cl.
*B01D 39/00* (2006.01)
(52) U.S. Cl. .............................. 96/408; 96/417; 55/523; 55/282.3; 55/284; 55/DIG. 10; 55/DIG. 30
(58) Field of Classification Search .................. 55/523, 55/282.3, 300, DIG. 10, DIG. 30, 385.3, 55/284; 95/278, 19, 20; 96/417, FOR. 170; 60/295, 274, 297.8, 311, 286, 303; 422/116, 422/168, 177, 188
See application file for complete search history.

(56) References Cited

U.S. PATENT DOCUMENTS

| 6,405,528 | B1 | 6/2002 | Christen et al. |
| 6,622,480 | B2 * | 9/2003 | Tashiro et al. ................. 60/295 |
| 6,829,889 | B2 | 12/2004 | Saito et al. |
| 6,928,809 | B2 | 8/2005 | Inoue et al. |
| 6,966,178 | B2 | 11/2005 | Saito et al. |
| 7,171,802 | B2 | 2/2007 | Inoue et al. |
| 7,197,868 | B2 | 4/2007 | Yahata et al. |

(Continued)

FOREIGN PATENT DOCUMENTS

EP    1 229 223    8/2002

(Continued)

OTHER PUBLICATIONS

French Search Report dated Jul. 21, 2009, issued in corresponding French Application No. 06 10239, with English translation.

(Continued)

*Primary Examiner*—Jason M Greene
*Assistant Examiner*—Karla Hawkins
(74) *Attorney, Agent, or Firm*—Nixon & Vanderhye PC (57) ABSTRACT

An exhaust gas cleaning device estimates a deposition amount of exhaust particulate matters in a collector based on deposition characteristics correlating the deposition amount with a pressure loss at the collector. The deposition characteristics define a first range from an initial point, at which the deposition amount is zero, to a transitional point and a second range over the transitional point. The pressure loss increases more gradually in the second range than in the first range as the deposition amount increases. The exhaust gas cleaning device corrects the deposition characteristics such that the transitional point approaches the initial point, the pressure loss at the initial point increases and an increase ratio of the pressure loss to the increase of the deposition amount in the second range increases as an ash deposition amount increases.

20 Claims, 6 Drawing Sheets

U.S. PATENT DOCUMENTS

| | | |
|---|---|---|
| 7,395,661 B2 | 7/2008 | Iida |
| 2002/0112472 A1 | 8/2002 | Tashiro et al. |
| 2003/0131592 A1 | 7/2003 | Saito et al. |
| 2004/0134187 A1 | 7/2004 | Inoue et al. |
| 2008/0155963 A1 | 7/2008 | Iida |

FOREIGN PATENT DOCUMENTS

| | | |
|---|---|---|
| EP | 1 387 051 | 2/2004 |
| JP | 2004-036454 | 2/2004 |
| JP | 2005-054629 | 3/2005 |
| WO | WO 03/100227 | 12/2003 |

OTHER PUBLICATIONS

German Office Action dated Oct. 13, 2009, issued in corresponding German Application No. 10 2006 035 458.3-13, with English translation.

Konstandopoulos, "Fundamental Studies of Diesel Particulate Filters: Transient Loading, Regeneration and Aging", Society of Automotive Engineers, Inc. (SAE) Paper No. 2000-01-1016, 2000, pp. 593-615.

Japanese Office Action dated Mar. 16, 2010, issued in corresponding Japanese Application No. 2005-339940, with English translation.

German Office Action dated Mar. 19, 2010, issued in corresponding German Application No. 10 2006 035 458.3-13, with English translation.

* cited by examiner

EXHAUST GAS CLEANING DEVICE FOR INTERNAL COMBUSTION ENGINE

CROSS REFERENCE TO RELATED APPLICATION

This application is based on and incorporates herein by reference Japanese Patent Application No. 2005-339940 filed on Nov. 25, 2005.

BACKGROUND OF THE INVENTION

1. Field of the Invention

The present invention relates to an exhaust gas cleaning device for an internal combustion engine having a collector for collecting exhaust particulate matters contained in exhaust gas of the engine.

2. Description of Related Art

In recent years, a collector for collecting exhaust particulate matters has been located in an exhaust pipe of a diesel internal combustion engine mounted to a vehicle to reduce exhaust particulate matters contained in discharged gas. The collector has a porous ceramic body with multiple exhaust flow passages. The collector adsorbs and collects the exhaust particulate matters when the exhaust gas passes through porous partition walls defining the exhaust flow passages. If the exhaust particulate matters collected in the collector are deposited in the collector, a pressure loss increases and engine efficiency decreases. Therefore, the collector is regenerated by combusting the exhaust particulate matters in the collector if the deposition amount reaches a predetermined value.

The deposition amount of the exhaust particulate matters is estimated by using the pressure loss as an input based on deposition characteristics correlating the deposition amount of the exhaust particulate matters in the collector with the pressure loss at the collector. The regeneration of the collector is performed if the estimated exhaust particulate matter deposition amount reaches the predetermined value, for example, as described in JP-A-2004-19523.

Pressure loss characteristics change if ash as residue of combustion of fuel or engine oil in the engine is deposited in the collector. Therefore, a certain device performs the regeneration of the collector if the pressure loss at the collector reaches a predetermined value and increases the predetermined value as the ash deposition amount increases, for example, as described in JP-A-2002-242660.

However, in the device described in JP-A-2004-19523, the deposition characteristics correlating the deposition amount of the exhaust particulate matters with the pressure loss do not take the influence of the ash deposition in the collector into consideration. Accordingly, there occurs a problem that the exhaust particulate matter deposition amount cannot be accurately estimated because of confusion between the change in the pressure loss due to the ash deposition and the change in the pressure loss due to the deposition of the exhaust particulate matters.

The device described in JP-A-2002-242660 determines the regeneration timing of the collector on the assumption that the pressure loss increases as the ash deposition amount increases. However, the pressure loss can decrease as the ash deposition amount increases even if the exhaust particulate matter deposition amount is the same, depending on the ash deposition state such as the deposition amount or deposition position of the ash. Therefore, there occurs a problem that the regeneration timing of the collector cannot be determined appropriately.

SUMMARY OF THE INVENTION

It is an object of the present invention to accurately estimate a deposition amount of exhaust particulate matters in an exhaust gas cleaning device for an internal combustion engine, which estimates the deposition amount of the exhaust particulate matters by using pressure loss as an input based on deposition characteristics correlating the deposition amount of the exhaust particulate matters with the pressure loss.

According to an aspect of the present invention, an exhaust gas cleaning device for an internal combustion engine has a first estimating device, a second estimating device, and a correcting device. The first estimating device estimates a deposition amount of ash in a collector. The second estimating device estimates a deposition amount of exhaust particulate matters by using a pressure loss at the collector as an input based on deposition characteristics correlating the deposition amount of the exhaust particulate matters with the pressure loss. The correcting device corrects the deposition characteristics in accordance with the deposition amount of the ash.

With this structure, the deposition characteristics are corrected in accordance with the ash deposition amount. Accordingly, the exhaust particulate matter deposition amount can be estimated with high accuracy.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
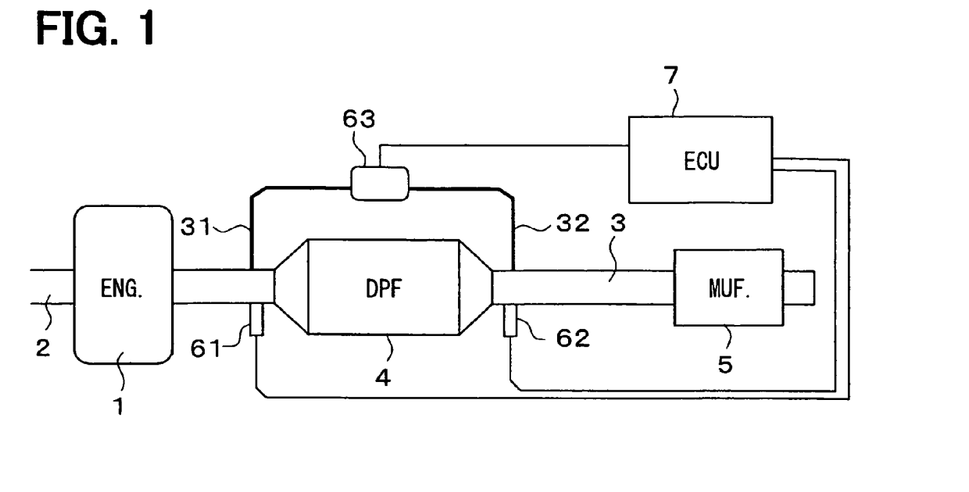
FIG. 1 is a schematic diagram showing an exhaust gas cleaning device of an internal combustion engine according to a first example embodiment of the present invention.

Referring to FIG. 1, an exhaust gas cleaning device for an internal combustion engine according to a first example embodiment of the present invention is illustrated. As shown in FIG. 1, a diesel engine (internal combustion engine) 1 as a power source for travel of a vehicle is connected with an intake pipe 2, through which intake air flows, and with an exhaust pipe 3, through which exhaust gas discharged from the engine 1 flows. A collector (DPF) 4 for collecting exhaust particulate matters (PM) and a muffler 5 are provided in the exhaust pipe 3.

Figure 2A:
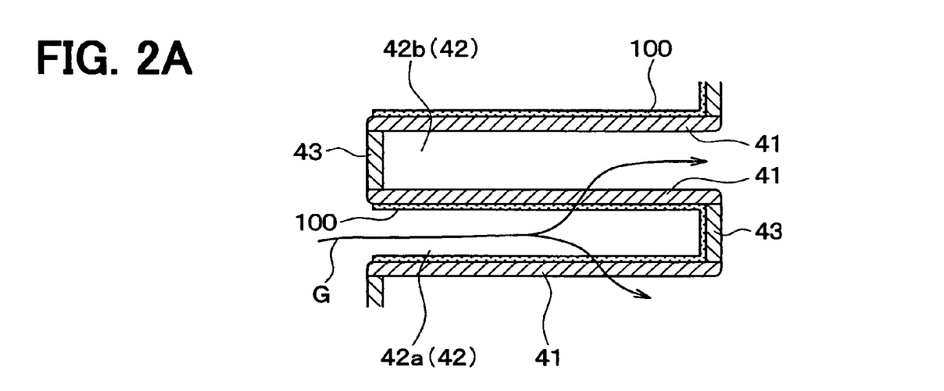
FIG. 2A is a sectional view showing a substantial portion of a collector according to the FIG. 1 embodiment.
Figure 2B:
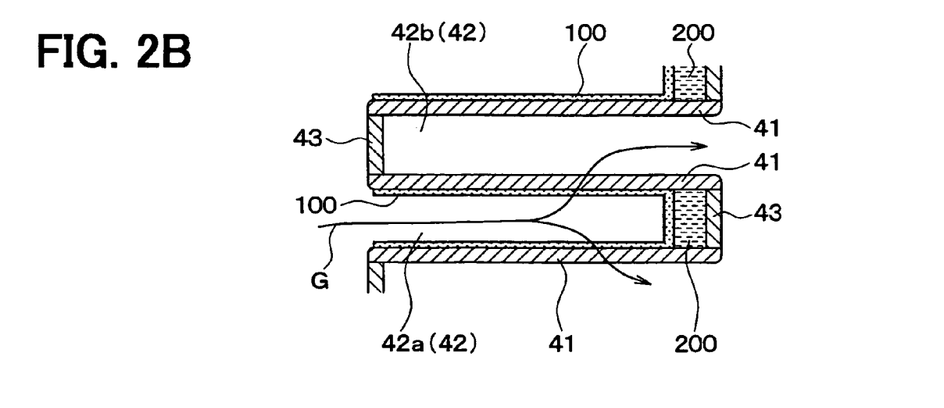
FIG. 2B is a sectional view showing the substantial portion of the collector according to the FIG. 1 embodiment.

The collector 4 is made by shaping a heat-resistant ceramic such as a cordierite in a honeycomb structure, for example, as shown in FIG. 2A or 2B. The collector 4 is formed with multiple exhaust flow passages 42 defined by porous partition walls 41. The multiple exhaust flow passages 42 are formed in parallel with each other. First exhaust flow passages 42a as a part of the exhaust flow passages 42 are opened on an upstream side with respect to an exhaust flow G and are blocked on a downstream side by plugs 43. Second exhaust flow passages 42b as the other part of the exhaust flow passages 42 are blocked by the plugs 43 on the upstream side and are opened on the downstream side with respect to the exhaust flow G. The porous partition walls 41 support an oxidation catalyst.

The exhaust gas discharged from the engine 1 enters the first exhaust flow passages 42a opening on the inlet side. Then, the exhaust gas passes through the porous partition walls 41 and flows into the adjacent second exhaust flow passages 42b. The exhaust particulate matters 100 are collected when the exhaust gas passes through the porous partition walls 41.

As shown in FIG. 1, a first temperature sensor 61 is provided immediately upstream of the collector 4 in the exhaust pipe 3. The first temperature sensor 61 senses temperature of the exhaust gas flowing into the collector 4. A second temperature sensor 62 is provided immediately downstream of the collector 4 in the exhaust pipe 3. The second temperature sensor 62 senses temperature of the exhaust gas flowing out of the collector 4.

The exhaust pipe 3 is connected with a first branch pipe 31 branching from the exhaust pipe 3 immediately upstream of the collector 4 and with a second branch pipe 32 branching from the exhaust pipe 3 immediately downstream of the collector 4. A differential pressure sensor 63 is provided between the two branch pipes 31, 32. The differential pressure sensor 63 senses a differential pressure between the inlet side and the outlet side of the collector 4, i.e., a pressure loss of the collector 4.

Outputs of the above-described various sensors are inputted into an ECU 7. The ECU 7 has a microcomputer consisting of CPU, ROM, RAM, EEPROM and the like. The ECU 7 executes collector regeneration control processing stored in the microcomputer to perform regeneration of the collector 4 at predetermined timing.

Figure 3:
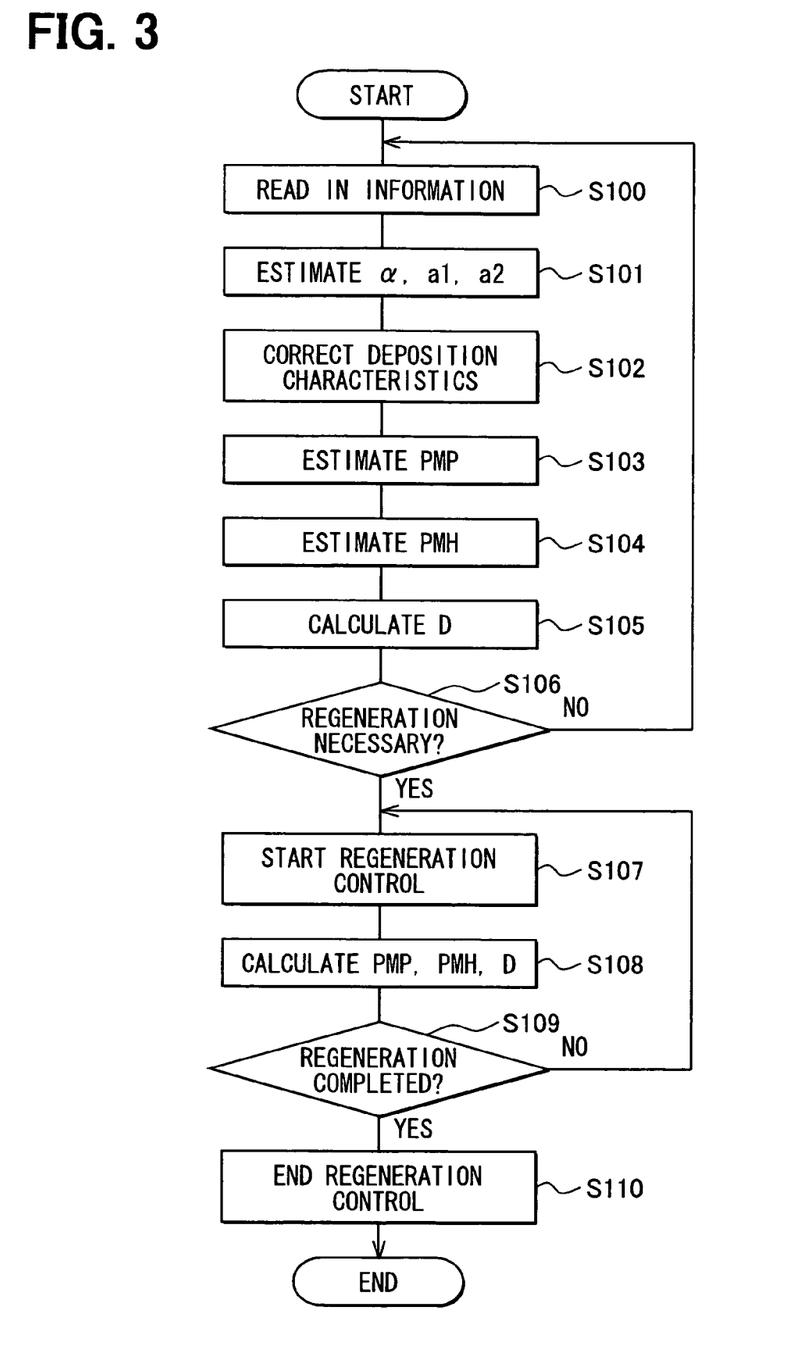
FIG. 3 is a flowchart showing collector regeneration control processing according to the FIG. 1 embodiment.

Next, an operation of the exhaust gas cleaning device according to the present embodiment will be explained. FIG. 3 is a flowchart showing the collector regeneration control processing performed by the ECU 7 according to the present embodiment. The control processing is started if a power is inputted to the ECU 7 through operation of a key switch. As those in the art will appreciate, such functional blocks (and/or groupings thereof) are often referred to as "modules" (or even "devices"), albeit such may correspond to particular segments of program memory sharing a CPU, RAM, ROM, etc.

First, Step S100 reads in various types of information. For example, Step S100 reads in the pressure loss ΔP of the collector 4 sensed by the differential pressure sensor 63, the temperature of the exhaust gas sensed by the first and second temperature sensors 61, 62, a travel distance D of the vehicle, rotation speed NE of the engine 1, a fuel injection amount F and the like.

Then, Step S101 calculates an amount of ash deposited in the collector 4.

Figure 4A:
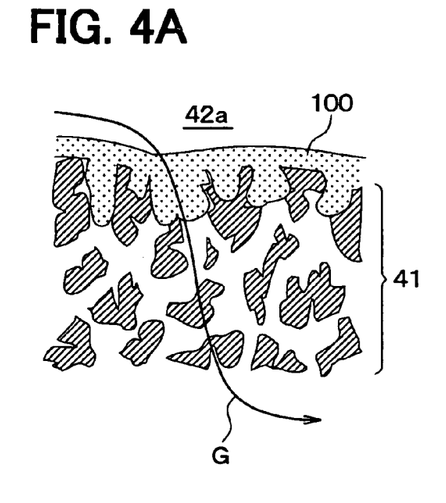
FIG. 4A is an enlarged sectional view showing a substantial portion of the collector according to the FIG. 1 embodiment.
Figure 4B:
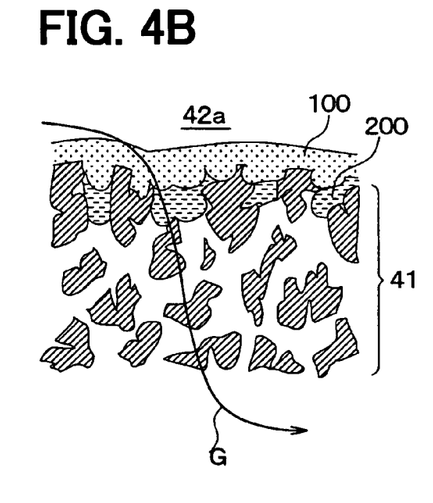
FIG. 4B is an enlarged sectional view showing the substantial portion of the collector according to the FIG. 1 embodiment.

The ash deposited in the collector 4 includes the ash 200 deposited in downstream portions of the first exhaust flow passages 42a with respect to the exhaust flow G as shown in FIG. 2B and the ash 200 deposited in the pores of the partition walls 41 of the collector 4 as shown in FIG. 4B.

Figure 5:
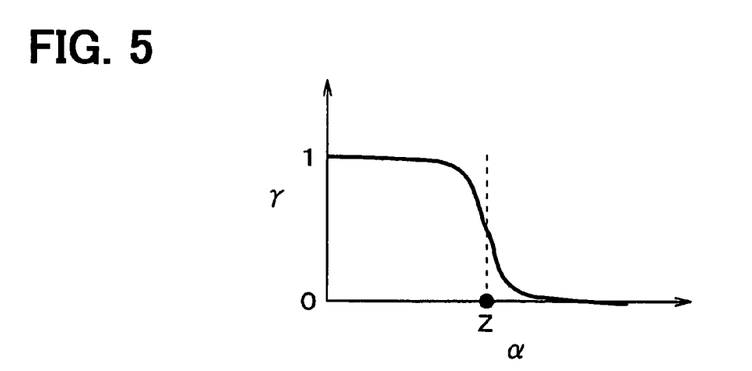
FIG. 5 is a graph showing a ratio of an amount of ash deposited in pores of partition walls of the collector to a total ash deposition amount according to the FIG. 1 embodiment.

FIG. 5 shows a relationship between an amount of entire ash deposited in the collector 4 (total ash deposition amount α) and a ratio γ of an amount of the ash newly deposited in the pores of the partition walls 41 out of the ash newly deposited in the collector 4. As shown in FIG. 5, almost all of the ash to be deposited in the collector 4 is deposited in the pores of the partition walls 41 in a period in which the total ash deposition amount α is small, i.e., in an initial period of the usage of the collector 4. Then, the ratio γ of the ash newly deposited in the pores of the partition walls 41 rapidly decreases as the total ash deposition amount α approaches an ash deposition limit amount Z to be deposited in the pores. With the rapid decrease of the ratio γ of the ash newly deposited in the pores of the partition walls 41, deposition of the ash in the downstream portions of the first exhaust flow passages 42a starts.

The deposition characteristics are affected by the deposition position and the deposition amount of the ash. Therefore, Step S101 calculates the total ash deposition amount α, the ash deposition amount a1 in the pores of the partition walls 41 and the ash deposition amount a2 in the downstream portions of the first exhaust flow passages 42a.

Figure 6:
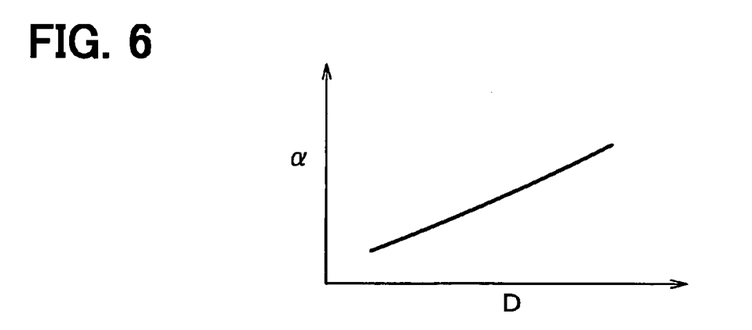
FIG. 6 is a characteristic diagram showing a relationship between a travel distance of a vehicle and the total ash deposition amount according to the FIG. 1 embodiment.

For example, the ROM of the ECU 7 stores a characteristic map, in which the total ash deposition amount α increases in proportion to the increase of the travel distance D of the vehicle as shown in FIG. 6. The total ash deposition amount α is calculated from the travel distance D of the vehicle based on the map shown in FIG. 6. Then, the total ash deposition amount α is compared with the ash deposition limit amount Z to be deposited in the pores. The ash deposition amount a1 in the pores is calculated on an assumption that the entire ash is deposited in the pores until the total ash deposition amount α reaches the ash deposition limit amount Z, i.e., $\alpha \leq Z$. The ash deposition amount a2 in the first exhaust flow passage downstream portions is calculated on an assumption that the entire ash is deposited in the first exhaust flow passage downstream portions if the total ash deposition amount α exceeds the ash deposition limit amount Z. More specifically, the ash deposition amount a2 in the first exhaust flow passage downstream portions is calculated by subtracting the ash deposition amount a1 in the pores (=ash deposition limit amount Z) from the total ash deposition amount α when α>Z.

Then, Step S102 performs correction of the deposition characteristics, which correlate the particulate matter deposition amount PM with the pressure loss ΔP of the collector 4, based on the ash deposition amount calculated at Step S101.

Figure 7:
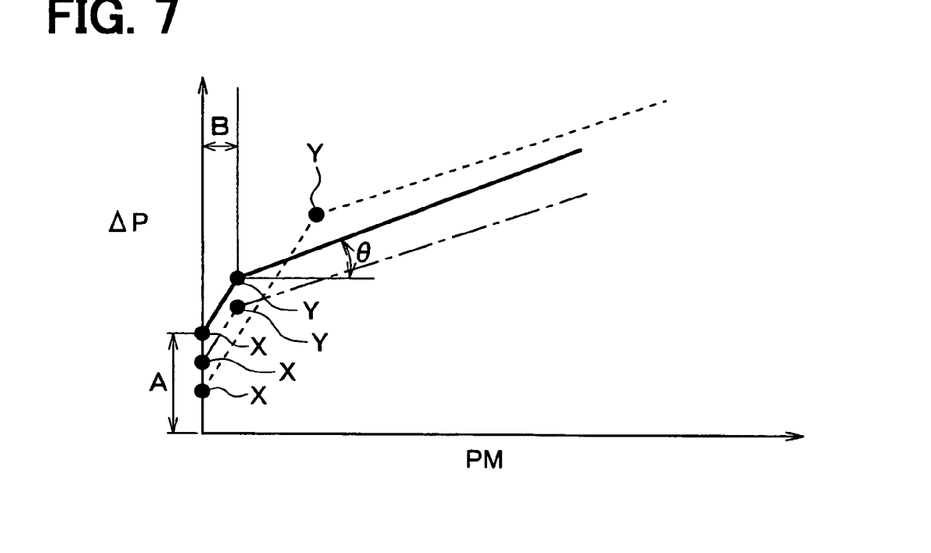
FIG. 7 is a characteristic diagram showing a relationship between a particulate matter deposition amount and pressure loss of the collector according to the FIG. 1 embodiment.

FIG. 7 shows a relationship between the particulate matter deposition amount PM and the pressure loss ΔP of the collector 4. More specifically, a broken line in FIG. 7 shows a relationship (initial deposition characteristics) between the particulate matter deposition amount PM and the pressure loss ΔP of the collector 4 in the case where the deposition of the exhaust particulate matters starts in a new product state, in which no particulate matter or ash has been deposited yet.

In an initial usage stage of the collector 4, as shown in FIG. 4A of a substantial portion of the collector 4, intrusion of the particulate matters 100 into the pores of the partition walls 41 of the collector 4 and clogging of the pores due to the intrusion of the particulate matters 100 are dominant factors of the increase of the pressure loss ΔP. After that, as shown in FIG. 2A or FIG. 4A, thickness of the layer of the particulate matters 100 deposited on the surface of the partition wall 41 becomes the dominant factor of the increase of the pressure loss ΔP.

Then, as shown in FIG. 7, in a first range extending from an initial point X, at which the particulate matter deposition amount PM is zero (PM=0), to a transitional point Y, the particulate matters 100 intrude into the pores of the partition walls 41 of the collector 4 and clog the pores. Therefore, the pressure loss ΔP increases drastically in accordance with the increase of the particulate matter deposition amount PM in the first range. In a second range in which the particulate matters are deposited in layers after the many pores are clogged, i.e., in a range in which the particulate matter deposition amount PM exceeds the transitional point Y, the pressure loss ΔP increases more gradually in accordance with the increase of the particulate matter deposition amount PM than in the first range. The initial deposition characteristics are stored in the ROM of the ECU 7.

A solid line or a chained line in FIG. 7 shows a relationship between the particulate matter deposition amount PM and the pressure loss ΔP of the collector 4 in the case where the usage of the collector 4 proceeds to a middle stage and the ash is deposited. That is, the solid line or the chained line in FIG. 7 shows corrected deposition characteristics.

In the case where the ash is deposited in accordance with the usage of the collector 4, first, the ash 200 is deposited in the pores of the partition walls 41 of the collector 4 as shown in FIG. 4B until the total ash deposition amount α reaches the ash deposition limit amount Z to be deposited in the pores. The total ash deposition amount α is compared with the ash deposition limit amount Z and the deposition characteristics are corrected based on the ash deposition amount a1 in the pores calculated at Step S101 as follows until the total ash deposition amount α reaches the ash deposition limit amount Z, i.e., $\alpha \leq Z$.

Figure 8A:
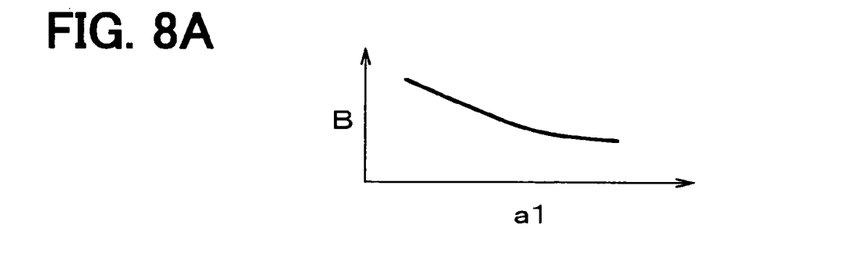
FIG. 8A is a characteristic diagram showing a transitional point particulate matter deposition amount with respect to the ash deposition amount in the pores of the partition walls of the collector according to the FIG. 1 embodiment.
Figure 8B:
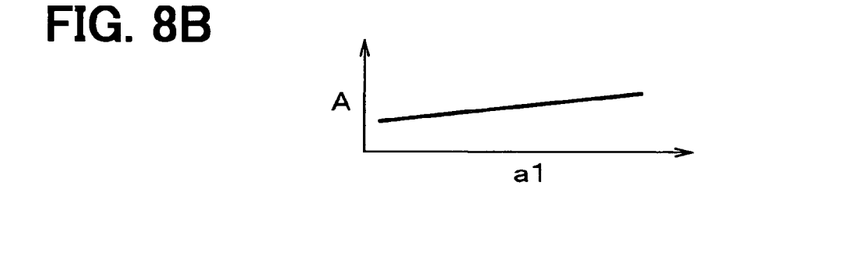
FIG. 8B is a characteristic diagram showing an initial point pressure loss with respect to the ash deposition amount in the pores of the partition walls of the collector according to the FIG. 1 embodiment.
Figure 8C:
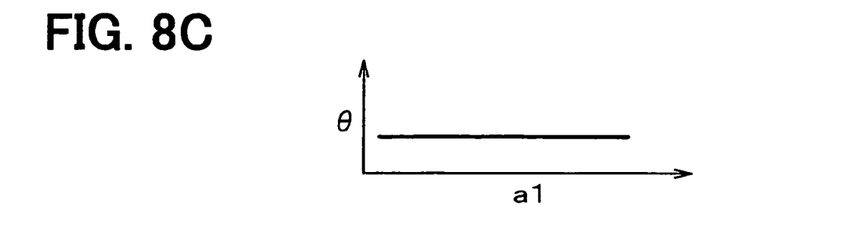
FIG. 8C is a characteristic diagram showing an increase ratio of the pressure loss to an increase of the particulate matter deposition amount in a second range with respect to the ash deposition amount in the pores of the partition walls of the collector according to the FIG. 1 embodiment.

FIGS. 8A, 8B and 8C are maps for calculating various types of values used in the correction of the deposition characteristics. More specifically, FIGS. 8A to 8C are maps for calculating a value B of the particulate matter deposition amount PM at the transitional point Y (transitional point particulate matter deposition amount B shown in FIG. 7), a value A of the pressure loss ΔP at the initial point X (initial point pressure loss A shown in FIG. 7) and an increase ratio θ of the pressure loss ΔP to the increase of the particulate matter deposition amount PM in the second range (second range increase ratio θ shown in FIG. 7) with respect to the ash deposition amount a1 in the pores. The maps are stored in the ROM of the ECU 7.

The particulate matter amount capable of being deposited in the pores decreases by the amount of the ash deposited in the pores. Therefore, as shown in FIG. 8A, the value of the transitional point particulate matter deposition amount B is decreased in accordance with the increase of the ash deposition amount a1 in the pores.

The initial point pressure loss A increases in accordance with the amount of the ash deposited in the pores. Therefore, as shown in FIG. 8B, the value of the initial point pressure loss A is increased in accordance with the increase of the ash deposition amount a1 in the pores.

The second range increase ratio θ does not change in the case where the ash has not yet been deposited in the first exhaust flow passage downstream portions even if the ash is deposited in the pores of the partition walls 41. Therefore, as shown in FIG. 8C, the second range increase ratio θ is constant regardless of the ash deposition amount a1 in the pores.

The values of the transitional point particulate matter deposition amount B, the initial point pressure loss A and the second range increase ratio θ are calculated from the ash deposition amount a1 in the pores, which is calculated at Step S101, based on the maps of FIGS. 8A to 8C.

The thus-calculated value of the initial point pressure loss A is greater than the initial point pressure loss A of the initial deposition characteristics. Therefore, as shown by a chained line in FIG. 7, the deposition characteristics are corrected such that the value of the initial point pressure loss A is greater than that of the initial deposition characteristics (shown by broken line in FIG. 7) without changing the increase ratio of the pressure loss ΔP with respect to the increase of the particulate matter deposition amount PM in the first range.

The calculated value of the transitional point particulate matter deposition amount B is smaller than the value of the transitional point particulate matter deposition amount B of the initial deposition characteristics. Therefore, as shown by the chained line in FIG. 7, the deposition characteristics are corrected such that the transitional point approaches the initial point X, i.e., such that the value of the transitional point particulate matter deposition amount B becomes small, without changing the increase ratio of the pressure loss ΔP with respect to the increase of the particulate matter deposition amount PM in the first range. In this case, the second range increase ratio θ is also not changed. The deposition characteristics after the correction are stored in the EEPROM of the ECU 7.

The deposition characteristics are corrected based on the ash deposition amount a2 in the first exhaust flow passage downstream portions calculated at Step S101 if the total ash deposition amount α exceeds the ash deposition limit amount Z, i.e., α>Z.

Figure 9A:
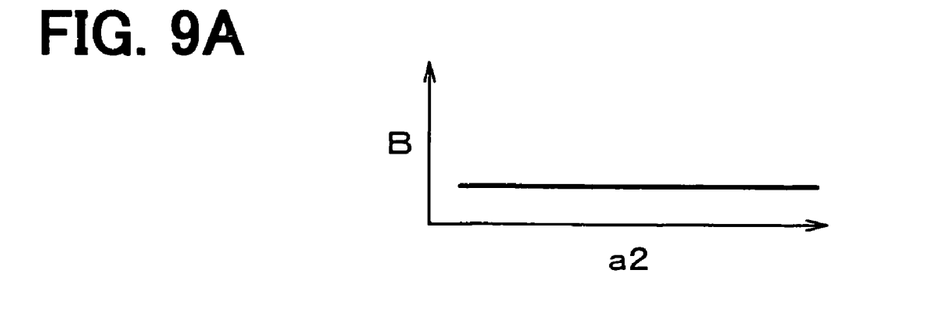
FIG. 9A is a characteristic diagram showing the transitional point particulate matter deposition amount with respect to an ash deposition amount in first exhaust flow passage downstream portions of the collector according to the FIG. 1 embodiment.
Figure 9B:
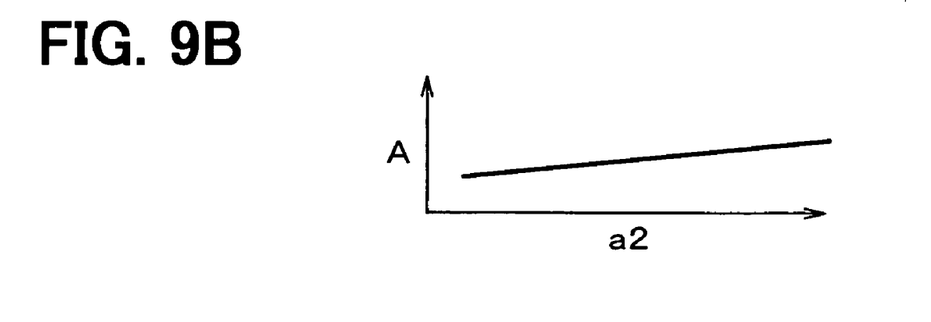
FIG. 9B is a characteristic diagram showing the initial point pressure loss with respect to the ash deposition amount in the first exhaust flow passage downstream portions of the collector according to the FIG. 1 embodiment.
Figure 9C:
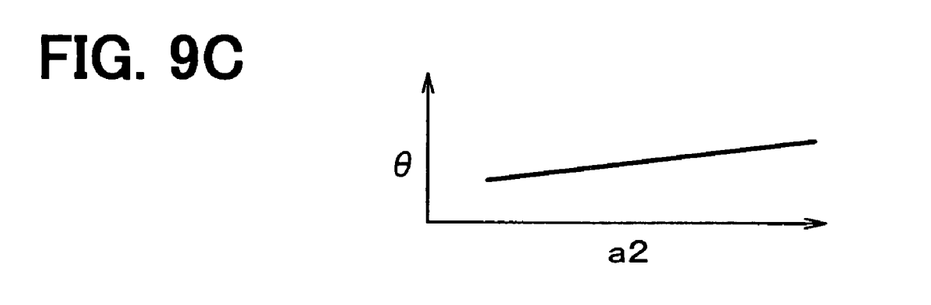
FIG. 9C is a characteristic diagram showing the increase ratio of the pressure loss to the increase of the particulate matter deposition amount in the second range with respect to the ash deposition amount in the first exhaust flow passage downstream portions of the collector according to the FIG. 1 embodiment.

FIGS. 9A, 9B and 9C are maps for calculating various types of values used in the correction of the deposition characteristics. More specifically, FIGS. 9A to 9C are maps for calculating the value of the transitional point particulate matter deposition amount B, the value of the initial point pressure loss A and the second range increase ratio θ with respect to the ash deposition amount a2 in the first exhaust flow passage downstream portions. The maps are stored in the ROM of the ECU 7.

If the ash is deposited in the first exhaust flow passage downstream portions, the deposited ash covers a part of the partition walls 41. In this case, the flow area of the exhaust gas at the partition walls 41 reduces and the pressure loss ΔP increases. Therefore, as shown in FIG. 9B, the value of the initial point pressure loss A is increased in accordance with the increase of the ash deposition amount a2 in the first exhaust flow passage downstream portions.

Under a situation that the total ash deposition amount α exceeds the ash deposition limit amount Z in the pores, the pressure loss is caused also by the ash in the pores. Therefore, the initial point pressure loss A shown in FIG. 9B is a summation of the pressure loss caused by the ash in the pores and the pressure loss caused by the ash in the first exhaust flow passage downstream portions. The initial point pressure loss A shown in FIG. 9B is greater than the initial point pressure loss A at the time when the total ash deposition amount α reaches the ash deposition limit amount Z.

The particulate matter deposition layer thickens and the pressure loss ΔP increases due to the reduction of the flow area of the exhaust gas at the partition walls 41 even if the particulate matter deposition amount PM is the same in the case where the ash is deposited in the first exhaust flow passage downstream portions compared to the case where the ash is not deposited in the first exhaust flow passage downstream portions. Therefore, as shown in FIG. 9C, the second range increase ratio θ is increased in accordance with the increase of the ash deposition amount a2 in the first exhaust flow passage downstream portions. The minimum value of the second range increase ratio θ shown in FIG. 9C is the same as the second range increase ratio θ in the case where there is no deposition of the ash in the first exhaust flow passage downstream portions.

As shown in FIG. 9A, the value of the transitional point particulate matter deposition amount B under a situation that the total ash deposition amount α exceeds the ash deposition limit amount Z in the pores is constant regardless of the ash deposition amount a2 in the first exhaust flow passage downstream portions and coincides with the value of the transitional point particulate matter deposition amount B at the time when the total ash deposition amount α reaches the ash deposition limit amount Z.

The value of the transitional point particulate matter deposition amount B, the value of the initial point pressure loss A and the second range increase ratio θ are calculated from the ash deposition amount a2 in the first exhaust flow passage downstream portions, which is calculated at Step S101, based on the map shown in FIGS. 9A to 9C.

The thus-calculated value of the initial point pressure loss A is greater than the value of the initial point pressure loss A of the deposition characteristics in the stage where the ash is deposited in the pores. Therefore, as shown by a solid line in FIG. 7, the deposition characteristics are corrected such that the value of the initial point pressure loss A becomes greater than that of the deposition characteristics (chained line in FIG. 7) of the stage where the ash is deposited in the pores without changing the increase ratio of the pressure loss ΔP with respect to the increase of the particulate matter deposition amount PM in the first range.

The second range increase ratio θ is greater than the second range increase ratio θ of the initial deposition characteristics or the second range increase ratio θ of the deposition characteristics of the stage where the ash is deposited in the pores. Therefore, as shown by the solid line in FIG. 7, the deposition characteristics are corrected such that the second range increase ratio θ is greater than that of the initial deposition characteristics (broken line in FIG. 7) or that of the deposition characteristics at the stage where the ash is deposited in the pores. At that time, the value of the transitional point particulate matter deposition amount B is unchanged. The deposition characteristics after the correction are stored in the EEPROM of the ECU 7.

The process goes to Step S103 after the execution of Step S102. Step S103 calculates the particulate matter deposition amount (differential-pressure-based particulate matter deposition amount PMP) from the pressure loss ΔP of the collector 4 read at Step S100 based on the newest deposition characteristics corrected at Step S102.

Then, Step S104 estimates the particulate matter deposition amount (history-based particulate matter deposition amount PMH) based on the inflow amount of the particulate matters from the engine 1 to the collector 4 and the combustion amount of the particulate matters in the collector 4. A method of calculating the history-based particulate matter deposition amount PMH is already known.

Then, Step S105 calculates the travel distance D of the vehicle from the completion of the last regeneration of the collector 4 to the present time (after-regeneration travel distance) based on the information about the travel distance D of the vehicle read in at Step S100.

Then, Step S106 provides a negative determination result (NO) if none of the differential-pressure-based particulate matter deposition amount PMP calculated at Step S103, the history-based particulate matter deposition amount PMH calculated at Step S104 and the after-regeneration travel distance calculated at Step S105 exceeds a corresponding regeneration start threshold value. The processing from Step S100 to Step S106 is repeated until Step S106 provides a positive determination result (YES).

After that, if any one of the differential-pressure-based particulate matter deposition amount PMP, the history-based particulate matter deposition amount PMH and the after-regeneration travel distance exceeds the corresponding regeneration start threshold value, Step S106 provides YES. In this case, the process goes to Step S107 to start the regeneration of the collector 4 with an already-known method. Thus, the particulate matters deposited in the collector 4 are combusted and eliminated.

Then, Step S108 calculates the differential-pressure-based particulate matter deposition amount PMP, the history-based particulate matter deposition amount PMH and the travel distance D of the vehicle after the regeneration is started.

Step S109 provides a negative determination result (NO) if none of the differential-pressure-based particulate matter deposition amount PMP, the history-based particulate matter deposition amount PMH and the travel distance D of the vehicle after the start of the regeneration reaches a corresponding regeneration end threshold value. The processing at Step S107 and Step S108 is repeated until Step S109 provides YES.

Step S109 estimates that the regeneration of the collector 4 is completed and provides YES if any one of the differential-pressure-based particulate matter deposition amount PMP, the history-based particulate matter deposition amount PMH and the travel distance D of the vehicle after the start of the regeneration calculated at Step S108 reaches the corresponding regeneration end threshold value. Then, the process goes to Step S110 to end the regeneration of the collector 4.

In the present embodiment, the deposition characteristics are suitably corrected in accordance with the ash deposition amount. That is, the deposition characteristics are corrected to exclude the change amount of the pressure loss caused by the ash deposition. Accordingly, the particulate matter deposition amount PM can be estimated accurately. As a result, the regeneration timing of the collector 4 can be suitably determined. Moreover, the deposition characteristics are suitably corrected in accordance with the deposition position and the deposition amount of the ash. Accordingly, the particulate matter deposition amount PM can be estimated further accurately.

Next, a second example embodiment of the present invention will be explained in reference to FIG. 10.

The first example embodiment calculates the total ash deposition amount $\alpha$ from the travel distance D of the vehicle. The second example embodiment calculates the total ash deposition amount $\alpha$ from the operation history of the engine 1. The total ash deposition amount $\alpha$ is correlated with the load of the engine 1. The load of the engine 1 can be estimated from the rotation speed NE and the fuel injection amount F of the engine 1. Therefore, the total ash deposition amount $\alpha$ is calculated by using information about the rotation speed NE and the fuel injection amount F of the engine 1 as the operation history of the engine 1.

Figure 10:
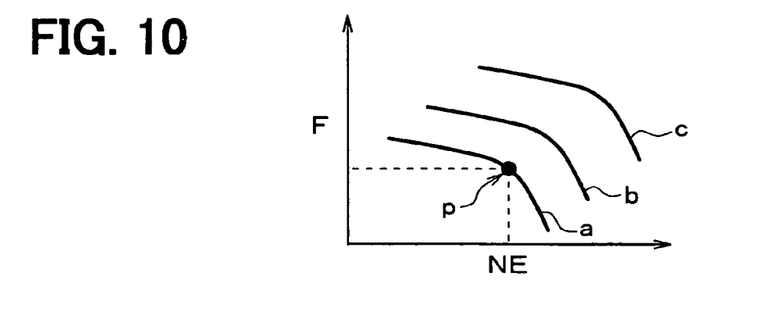
FIG. 10 is a graph showing relationships among rotation speed of an internal combustion engine, a fuel injection amount of the engine and an ash deposition increase amount according to a second example embodiment of the present invention.

FIG. 10 is a diagram showing relationships among the rotation speed NE of the engine 1, the fuel injection amount F of the engine 1 and the ash deposition increase amount per unit time. Each one of characteristic lines a, b, c of FIG. 10 is made by connecting the points of the same ash deposition increase amount per unit time. The ash deposition increase amount per unit time is larger on the line b than on the line a. The ash deposition increase amount per unit time is larger on the line c than on the line b. The ROM of the ECU 7 stores a map of the characteristics that the ash deposition increase amount per unit time increases as the rotation speed NE of the engine 1 increases and the ash deposition increase amount per unit time increases as the fuel injection amount F increases as shown in FIG. 10.

The ECU 7 calculates the total ash deposition amount $\alpha$ at a calculation interval of a constant time. First, the ECU 7 calculates an average value of the rotation speed NE of the engine 1 and an average value of the fuel injection amount F during a calculation interval time from previous calculation timing to present calculation timing, and then, calculates the ash deposition increase amount per unit time from the map. More specifically, the ECU 7 obtains a characteristic line (line a, for example) running on a point (point p in FIG. 10 in this example), on which the rotation speed NE of the engine 1 intersects with the fuel injection amount F in the map, and calculates the ash deposition increase amount per unit time.

Then, the ECU 7 calculates the ash deposition increase amount during the calculation interval time from the previous calculation timing to the present calculation timing by multiplying the calculated ash deposition increase amount per unit time by the calculation interval time. Then, the ECU 7 calculates the present total ash deposition amount $\alpha$ by adding the ash deposition increase amount to the previous total ash deposition amount $\alpha$.

Figure 11:
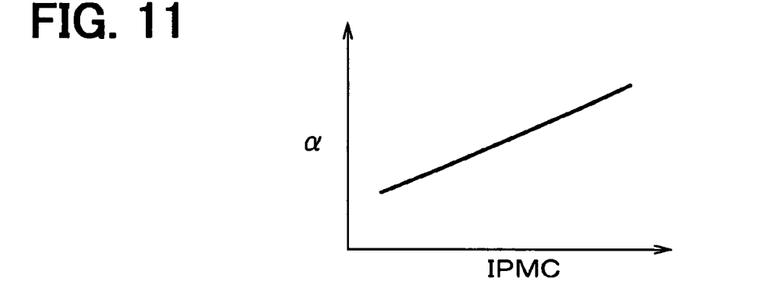
FIG. 11 is a diagram showing a relationship between an integration value of a particulate matter combustion amount and a total ash deposition amount according to a third example embodiment of the present invention.
Figure 12:
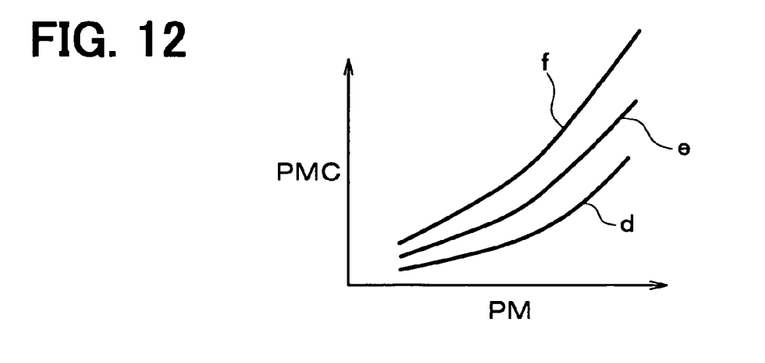
FIG. 12 is a diagram showing relationships among a particulate matter deposition amount, temperature in a collector and the particulate matter combustion amount according to the FIG. 11 embodiment.

Next, a third example embodiment of the present invention will be explained in reference to FIGS. 11 and 12. FIG. 11 is a diagram showing a relationship between an integration value IPMC of the particulate matter combustion amount PMC and the total ash deposition amount $\alpha$. FIG. 12 is a diagram showing relationships among the particulate matter deposition amount PM, the temperature inside the collector 4, and the particulate matter combustion amount PMC per unit time.

In the first example embodiment, the total ash deposition amount $\alpha$ is calculated from the travel distance D of the vehicle. In the third example embodiment, the total ash deposition amount $\alpha$ is calculated from the integration value IPMC of the particulate matter combustion amount PMC from the start of the usage of the collector 4 to the present time.

The total ash deposition amount $\alpha$ is correlated with the load of the engine 1. The load of the engine is correlated with the particulate matter discharge amount. The particulate matter discharge amount is correlated with the particulate matter combustion amount PMC. Therefore, the total ash deposition amount $\alpha$ can be estimated from the particulate matter combustion amount PMC. More specifically, as shown in FIG. 11, the ash deposition amount $\alpha$ increases as the integration value IPMC of the particulate matter combustion amount PMC increases.

Characteristic lines d, e, f in FIG. 12 show characteristics at respective values of the temperature in the collector 4. The temperature in the collector 4 is higher on the line e than on the line d. The temperature in the collector 4 is higher on the line f than on the line e. As shown in FIG. 12, the particulate matter combustion amount PMC per unit time increases as the particulate matter deposition amount PM increases and increases as the temperature in the collector 4 increases. Average temperature of the exhaust gas sensed with the first and second temperature sensors 61, 62 may be used as the temperature inside the collector 4.

The ROM of the ECU 7 stores the maps of the characteristics shown in FIGS. 11 and 12. The ECU 7 calculates the total ash deposition amount $\alpha$ at a calculation interval of a constant time. The ECU 7 calculates the particulate matter deposition amount PM and calculates an average value of the temperature inside the collector 4 during the calculation interval time from the previous calculation timing to the present calculation timing. The ECU 7 calculates the particulate matter combustion amount PMC per unit time from the map. More specifically, the particulate matter combustion amount PMC per unit time is provided by a point in the map, on which the characteristic line corresponding to the temperature inside the collector 4 intersects with the particulate matter deposition amount PM.

Then, the ECU 7 calculates the particulate matter combustion amount PMC during the calculation interval time from the previous calculation timing to the present calculation timing by multiplying the calculated particulate matter combustion amount PMC per unit time by the calculation interval time. Then, the ECU 7 calculates the present particulate matter combustion amount integration value IPMC by adding the particulate matter combustion amount PMC to the previous particulate matter combustion amount integration value IPMC. Then, the ECU 7 calculates the total ash deposition amount $\alpha$ from the present particulate matter combustion amount integration value IPMC based on the map of FIG. 11.

Figure 13:
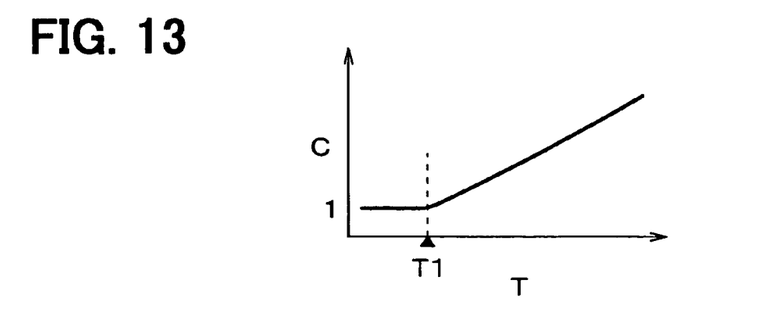
FIG. 13 is a diagram showing a relationship between temperature in a collector and a total ash deposition amount correction value according to a fourth example embodiment of the present invention.

Next, a fourth example embodiment of the present invention will be explained in reference to FIG. 13. FIG. 13 is a diagram showing a relationship between the temperature T inside the collector 4 and an ash deposition amount correction value C.

Part of the ash passes through the porous partition walls 41 to an outside of the collector 4, and the other part of the ash is deposited in the partition walls 41. If the temperature T inside the collector 4 increases, ash particles are sintered and a particle diameter of the ash increases. In this case, it becomes difficult for the ash to pass through the porous partition walls 41. Therefore, the present embodiment corrects the ash deposition amount based on the temperature T inside the collector 4.

As shown in FIG. 13, the ash deposition amount correction value C is set at 1 in a range where the temperature T inside the collector 4 is lower than ash particle diameter growth start temperature T1, above which the ash particles are sintered and the ash particle diameter increases. The ash deposition amount correction value C is increased in accordance with the increase of the temperature T inside the collector 4 in a range where the temperature T inside the collector 4 is equal to or higher than the ash particle diameter growth start temperature T1. The ROM of the ECU 7 stores the map of the characteristics shown in FIG. 13.

The ECU 7 calculates the total ash deposition amount α at a calculation interval of a constant time. The ECU 7 calculates an average value of the temperature T inside the collector 4 during the calculation interval time from the previous calculation timing to the present calculation timing and obtains the ash deposition amount correction value C from the map. The ECU 7 calculates the ash deposition increase amount during the calculation interval time from the previous calculation timing to the present calculation timing, for example, by using the method according to the second example embodiment.

Then, the ECU 7 calculates the corrected ash deposition increase amount by multiplying the ash deposition increase amount by the ash deposition amount correction value C. The ECU 7 calculates the present total ash deposition amount α by adding the ash deposition increase amount to the previous total ash deposition amount α.

Thus, by considering the particle diameter of the ash, the total ash deposition amount α can be estimated more accurately.

The particulate matter combustion amount during the calculation interval time from the previous calculation timing to the present calculation timing may be calculated by the method of the third example embodiment, and the corrected particulate matter combustion amount may be calculated by multiplying the particulate matter combustion amount by the ash deposition amount correction value. Then, the present particulate matter combustion amount integration value may be calculated by adding the corrected particulate matter combustion amount to the previous particulate matter combustion amount integration value, and the total ash deposition amount α may be calculated from the present particulate matter combustion amount integration value.

Alternatively, a ratio of time in which the temperature T inside the collector 4 is equal to or higher than the ash particle diameter growth start temperature T1 to the operation time from the start of the usage of the collector 4 to the present time may be calculated. The ash deposition amount correction value C may be set to increase as the ratio increases, and the total ash deposition amount may be calculated by multiplying the total ash deposition amount calculated by the method of the first example embodiment by the ash deposition amount correction value.

The ash deposition amount is estimated by a single method in each of the above-described example embodiments. Alternatively, the ash deposition amount may be estimated based on at least two out of the vehicle travel distance D, the operation history of the engine 1, and the particulate matter combustion amount integration value IPMC. In this case, an average value of the estimates obtained through the respective methods may be used as the total ash deposition amount α. Alternatively, the value having the largest divergence out of the estimates of the three methods may be excluded and an average value of the two estimates of the remaining two methods may be used as the total ash deposition amount α.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An exhaust gas cleaning device for an internal combustion engine having a collector with porous partition walls in an exhaust system of the engine for collecting exhaust particulate matters contained in exhaust gas when the exhaust gas passes through pores in the partition walls of the collector, the exhaust gas cleaning device performing regeneration of the collector by causing combustion of the exhaust particulate matters deposited in the collector if a deposition amount of the exhaust particulate matters in the collector exceeds a predetermined value, the exhaust gas cleaning device comprising:

sensors disposed to detect operating conditions of the collector and to provide corresponding output signals;

an electronic control unit having at least one processor connected to receive said output signals and to control regeneration of the collector, said electronic control unit being configured to include:

a first means that estimates a deposition amount of ash in the collector;

a second means that estimates a deposition amount of exhaust particulate matters in the collector by using a pressure loss across the collector as an input for use with deposition characteristic data correlating exhaust particulate matter deposition amount with said pressure loss; and a third means that corrects the deposition characteristic data in accordance with the deposition amount of the ash such that the pressure loss increases in accordance with an increase of the deposition amount of the exhaust particulate matters in a first range extending from an initial point, at which the deposition amount of the exhaust particulate matters is zero, to a transitional point and such that the pressure loss increases more gradually in a second range, in which the deposition amount of the exhaust particulate matters is greater than the deposition amount at the transitional point than in the first range in accordance with the increase of the deposition amount of the exhaust particulate matters, and as the deposition amount of the ash increases, the transitional point is moved toward the initial point such that the pressure loss at the initial point increases as the deposition amount of the ash increases, and an increased ratio of pressure loss with respect to deposition amount of exhaust particulate matters in the second range increases as the deposition amount of ash increases.

2. The exhaust gas cleaning device as in claim 1, wherein:
the partition walls of the collector define multiple exhaust flow passages in parallel with each other in the collector,
the exhaust flow passages provide first exhaust flow passages, which are opened on an upstream side with respect to a flow direction of the exhaust gas and are blocked on a downstream side, and second exhaust flow passages, which are blocked on the upstream side and are opened on the downstream side,
the collector is provided such that the exhaust gas enters the first exhaust flow passages first and then flows into the second exhaust flow passages through the partition walls, and
the first means estimates the amount of the ash deposited in the pores of the partition walls on an assumption that the ash is deposited in the pores of the partition walls if the ash deposition amount is equal to or smaller than a certain value and estimates the amount of the ash deposited in downstream portions of the first exhaust flow passages with respect to the flow direction of the exhaust gas on an assumption that the ash is deposited in the downstream portions of the first exhaust flow passages if the ash deposition amount exceeds the certain value.

3. The exhaust gas cleaning device as in claim 2, wherein:
the third means corrects the deposition characteristics such that the transitional point approaches the initial point as the amount of the ash deposited in the pores of the partition walls increases and such that the pressure loss at the initial point increases as the amount of the ash deposited in the partition walls increases.

4. The exhaust gas cleaning device as in claim 2, wherein:
the third means corrects the deposition characteristics such that the pressure loss at the initial point increases as the amount of the ash deposited in the downstream portions of the first exhaust flow passages increases and such that the increase ratio of the pressure loss in the second range with respect to the increase of the deposition amount of the exhaust particulate matters increases as the amount of the ash deposited in the downstream portions of the first exhaust flow passages increases.

5. The exhaust gas cleaning device as in claim 1, wherein:
the sensors also detect travel distance of a vehicle mounted with the engine; and
the first means performs the estimation such that the ash deposition amount increases as a travel distance of a vehicle mounted with the engine increases.

6. The exhaust gas cleaning device as in claim 1, wherein:
the electronic control unit is configured to access data representing an operation history of the engine; and
the first means estimates the deposition amount of the ash based on an operation history of the engine.

7. The exhaust gas cleaning device as in claim 6, wherein:
the operation history includes a history of rotation speed of the engine and a history of a fuel injection amount of the engine, and
the first means performs the estimation such that the deposition amount of the ash increases as the rotation speed of the engine increases and such that the deposition amount of the ash increases as the fuel injection amount increases.

8. The exhaust gas cleaning device as in claim 1, wherein:
the first means performs the estimation such that the deposition amount of the ash increases as an integration value of a combustion amount of the exhaust particulate matters increases.

9. The exhaust gas cleaning device as in claim 8, wherein:
the first means performs the estimation such that the combustion amount of the exhaust particulate matters increases as temperature inside the collector increases and such that the combustion amount of the exhaust particulate matters increases as the deposition amount of the exhaust particulate matters increases.

10. The exhaust gas cleaning device as in claim 1, wherein:
the electronic control unit is configured to have access to at least two of: travel distance of a vehicle mounted with the engine, an operation history of the engine and an integration value of a combustion amount of the exhaust particulate matters; and
the first means estimates the deposition amount of the ash based on at least two of: a travel distance of a vehicle mounted with the engine, an operation history of the engine, and an integration value of a combustion amount of the exhaust particulate matters.

11. The exhaust gas cleaning device as in claim 1, wherein:
the first means performs the estimation such that the deposition amount of the ash increases as temperature inside the collector increases.

12. A method of using an exhaust gas cleaning device for an internal combustion engine having a collector with porous partition walls in an exhaust system of the engine for collecting exhaust particulate matters contained in exhaust gas when the exhaust gas passes through pores in the partition walls of the collector, the exhaust gas cleaning device performing regeneration of the collector by causing combustion of the exhaust particulate matters deposited in the collector if a deposition amount of the exhaust particulate matters in the collector exceeds a predetermined value, said method comprising:
use of sensors disposed to detect operating conditions of the collector and to provide corresponding output signals and an electronic control unit having at least one processor connected to receive said output signals and to control regeneration of the collector, said electronic control unit being configured to:
estimate a deposition amount of ash in the collector;
estimate a deposition amount of exhaust particulate matters in the collector by using a pressure loss across the collector as an input for use with deposition characteristic data correlating exhaust particulate matter deposition amount with said pressure loss; and
correct the deposition characteristic data in accordance with the deposition amount of the as such that the pressure loss increases in accordance with an increase of the deposition amount of the exhaust particulate matters in a first range extending from an initial point, at which the deposition amount of the exhaust particulate matters is zero, to a transitional point and such that the pressure loss increases more gradually in a second range, in which the deposition amount of the exhaust particulate matters is greater than the deposition amount at the transitional point than in the first range in accordance with the increase of the deposition amount of the exhaust particulate matters, and as the deposition amount of the ash increases, the transitional point is moved toward the initial point such that the pressure loss at the initial point increases as the deposition amount of the ash increases, and an increased ratio of pressure loss with respect to deposition amount of exhaust particulate matters in the second range increases as the deposition amount of ash increases.

13. The method as in claim 12, wherein:

the partition walls of the collector define multiple exhaust flow passages in parallel with each other in the collector, the exhaust flow passages provide first exhaust flow passages, which are opened on an upstream side with respect to a flow direction of the exhaust gas and are blocked on a downstream side, and second exhaust flow passages, which are blocked on the upstream side and are opened on the downstream side, the collector is provided such that the exhaust gas enters the first exhaust flow passages first and then flows into the second exhaust flow passages through the partition walls, and the estimated amount of ash deposited in the pores of the partition walls is based on an assumption that the ash is deposited in the pores of the partition walls if the ash deposition amount is equal to or smaller than a certain value and estimates the amount of the ash deposited in downstream portions of the first exhaust flow passages with respect to the flow direction of the exhaust gas on an assumption that the ash is deposited in the downstream portions of the first exhaust flow passages if the ash deposition amount exceeds the certain value.

14. The method as in claim 13, wherein:

the deposition characteristics are corrected such that the transitional point approaches the initial point as the amount of the ash deposited in the pores of the partition walls increases and such that the pressure loss at the initial point increases as the amount of the ash deposited in the partition walls increases.

15. The method as in claim 13, wherein:

the deposition characteristics are corrected such that the pressure loss at the initial point increases as the amount of the ash deposited in the downstream portions of the first exhaust flow passages increases and such that the increase ratio of the pressure loss in the second range with respect to the increase of the deposition amount of the exhaust particulate matters increases as the amount of the ash deposited in the downstream portions of the first exhaust flow passages increases.

16. The method as in claim 12, wherein:

the estimation of ash deposition amount increases as a travel distance of a vehicle mounted with the engine increases.

17. The method as in claim 12, wherein:

the deposition amount of ash is based on an operation history of the engine.

18. The method as in claim 17, wherein:

the operation history includes a history of rotation speed of the engine and a history of a fuel injection amount of the engine, and the estimation of the deposition amount of ash increases as the rotation speed of the engine increases and as the fuel injection amount increases.

19. The method as in claim 12, wherein:

the estimation of the deposition amount of ash increases as an integration value of a combustion amount of the exhaust particulate matters increases.

20. The method as in claim 19, wherein:

the combustion amount of the exhaust particulate matters increases as temperature inside the collector increases and the combustion amount of the exhaust particulate matters increases as the deposition amount of the exhaust particulate matters increases.

* * * * *